US009412150B2

(12) United States Patent
Fialho et al.

(10) Patent No.: US 9,412,150 B2
(45) Date of Patent: Aug. 9, 2016

(54) METHOD AND APPARATUS FOR VISUALLY REPRESENTING OBJECTS WITH A MODIFIED HEIGHT

(71) Applicant: HERE Global B.V., Veldhoven (NL)

(72) Inventors: Andre Tadeu Santos Fialho, Berlin (DE); Astrid Fasold, Berlin (DE); Aaron Rincover, Berlin (DE)

(73) Assignee: HERE Global B.V., Veldhoven (NL)

( * ) Notice: Subject to any disclaimer, the term of this patent is extended or adjusted under 35 U.S.C. 154(b) by 523 days.

(21) Appl. No.: 13/674,402

(22) Filed: Nov. 12, 2012

(65) Prior Publication Data

US 2014/0132593 A1 May 15, 2014

(51) Int. Cl.
G06T 19/00 (2011.01)
G06T 3/40 (2006.01)
G01C 21/36 (2006.01)
G09B 29/12 (2006.01)

(52) U.S. Cl.
CPC ............ G06T 3/40 (2013.01); G01C 21/3638 (2013.01); G01C 21/3682 (2013.01); G09B 29/12 (2013.01)

(58) Field of Classification Search
CPC .. G06T 3/40; G01C 21/3638; G01C 21/3682; G01C 29/12
USPC .................. 345/419, 426, 472, 593, 660, 666
See application file for complete search history.

(56) References Cited

U.S. PATENT DOCUMENTS

2002/0123841 A1* 9/2002 Satoh et al. ................... 701/208
2013/0131978 A1* 5/2013 Han et al. ...................... 701/436
2014/0071119 A1* 3/2014 Piemonte et al. ............. 345/419

FOREIGN PATENT DOCUMENTS

EP 1 024 467 A2 8/2000
EP 2 437 237 A2 4/2012

OTHER PUBLICATIONS

International Search Report and Written Opinion for Application No. PCT/EP2013/073202 dated Feb. 17, 2014.

* cited by examiner

Primary Examiner — Phi Hoang
Assistant Examiner — Michael Le
(74) Attorney, Agent, or Firm — Alston & Bird LLP

(57) ABSTRACT

A method, apparatus and computer program product are provided to cause a visual representation of a plurality of objects representative of respective physical structures to be provided with the height of at least one of the objects being modified, thereby visually accentuating the object(s). In regards to a method, one or more objects representative of respective physical structures are identified from among a plurality of objects. The plurality of objects therefore include first object (s) that were identified and second object(s) that were not identified. Each object has an associated height. The method may also modify the height associated with at least one of the objects such that a height differential between the first objects and the second objects is altered. The method may also cause a visual representation of the plurality of objects to be provided with at least one of the objects having a modified height.

20 Claims, 7 Drawing Sheets

METHOD AND APPARATUS FOR VISUALLY REPRESENTING OBJECTS WITH A MODIFIED HEIGHT

TECHNOLOGICAL FIELD

An example embodiment of the present invention relates generally to the visual representation of a plurality of objects representative of respective physical structures and, more particularly, to the visual representation of a plurality of objects representative of respective physical structures with at least one of the objects having a modified height to facilitate a user's review of the resulting image.

BACKGROUND

Users of computing devices commonly access applications, such as mapping applications, in order to obtain directions or to identify a particular building or other point of interest. For example, a user may enter a query that is intended to locate businesses of a certain type, such as restaurants, in the proximity of the user. Based upon this query, the computing device may display an image that provides a visual representation of the buildings in the proximity of the user with the restaurants within those buildings being identified. Alternatively, a user may request directions to a particular address or a particular point of interest with the computing device then providing an indication of the directions, such as in terms of a written series of directions or a graphical representation of a route to the particular address or point of interest.

The visual representation of the buildings as provided by a mapping or other application may be three dimensional. As such, the visual representation of a building may not only define the footprint of the building relative to the various streets or other avenues, but may also provide an indication of the height of the building. Thus, taller buildings are visually represented so as to have a greater height than shorter buildings. In this regard, the three-dimensional visual representation of the buildings is intended to provide additional information to the user in order to permit the user to recognize their surroundings and more easily interpret the information provided by the display, such as the location of a selected building or point of interest or a route to an intended destination. Nonetheless, the additional information provided by a three-dimensional visual representation of the buildings may sometimes provide for such a complex display that the information solicited by the user is more challenging to identify than would be desirable.

BRIEF SUMMARY

A method, apparatus and computer program product are provided in accordance with an example embodiment in order to cause a visual representation of a plurality of objects representative of respective physical structures, such as buildings, to be provided with the height of at least one of the objects being modified. As such, the method, apparatus and computer program product of an example embodiment permit one or more objects that have been identified, such as in response to user input, to be highlighted as a result of the modified height of at least one of the objects within the visual representation of the objects. For example, one or more objects may be identified in response to a search query or in response to a user selection, and the height differential between the objects that were identified and the objects that were not identified may be increased in order to visually accentuate the objects that were identified in response to the user input.

In one embodiment, a method is provided that includes identifying one or more objects representative of respective physical structures from among a plurality of objects representative of respective physical structures, such as in response to user input. As a result of the identification of one or more objects representative of respective physical structures, the plurality of objects may include one or more first objects that were identified and one or more second objects that were not identified. Each object has an associated height. The method of this embodiment also includes modifying, with a processor, the height associated with at least one of the objects representative of respective physical structures. Thus, a height differential between the first objects that were identified and the second objects that were not identified is altered. In this regard, the modification of the height causes at least one of the objects to have a modified height. The method of this embodiment also includes causing a visual representation of the plurality of objects, such as a three-dimensional visual representation, to be provided with at least one of the objects having the modified height.

The modification of the height may, in one embodiment, include increasing the height differential between the first objects that were identified and the second objects that were not identified. For example, the height of the second objects that were not identified may be reduced, such as by flattening the height of the second objects to ground. In regards to causing the visual representation of the plurality of objects to be provided, the method of one embodiment may also cause the visual representation of the first objects that were identified to have a predefined color.

In another embodiment, an apparatus is provided that includes at least one processor and at least one memory including computer program code with the at least one memory and the computer program code configured to, with the processor, cause the apparatus to at least identify one or more objects representative of respective physical structures from among a plurality of objects representative of respective physical structures. For example, the one or more objects may be identified in response to user input. Following the identification of one or more objects representative of respective physical structures, the plurality of objects may include one or more first objects that were identified and one or more second objects that were not identified. Each object may have an associated height. The at least one memory and the computer program code may also be configured to, with the processor, cause the apparatus of this embodiment to modify the height associated with at least one of the objects. As such, a height differential between the first objects that were identified and the second objects that were not identified is altered. The modification of the height causes at least one of the objects to have a modified height. The at least one memory and the computer program code may also be configured to, with the processor, cause the apparatus of this embodiment to cause a visual representation, such as a three-dimensional visual representation, of the plurality of objects to be provided with at least one of the objects having the modified height.

The at least one memory and the computer program code may be configured to, with the processor, cause the apparatus in one embodiment to modify the height by increasing the height differential between the first objects that were identified and the second objects that were not identified. In this regard, the at least one memory and the computer program code may be configured to, with the processor, cause the apparatus to modify the height by reducing the height of the second objects that were not identified, such as by flattening the height of the second objects to ground. The at least one memory and the computer program code may be configured to, with the processor, cause the apparatus of an example embodiment to cause the visual representation of the plurality of objects to be provided by causing the visual representation of the first objects that were identified to also have a predefined color.

In a further embodiment, a computer program product is provided that includes at least one non-transitory computer-readable storage medium having computer-executable program code portions stored therein with the computer-executable program code portions including program code instructions for identifying one or more objects representative of respective physical structures from among a plurality of objects representative of respective physical structures. As such, the plurality of objects includes one or more first objects that were identified and one or more second objects that were not identified. Each object has an associated height. In accordance with this embodiment, the computer-executable program code portions also include program code instructions for modifying the height associated with at least one of the objects representative of respective physical structures. As such, the height differential between the first objects that were identified and the second objects that were not identified is altered. Modification of the height causes at least one of the objects to have a modified height. The computer-executable program code portions of this embodiment also include program code instructions for causing a visual representation, such as a three-dimensional visual representation, of the plurality of objects to be provided with at least one of the objects having the modified height.

The program code instructions for modifying the height of the objects representative of respective physical structures in accordance with an example embodiment may include program code instructions for increasing the height differential between the first objects that were identified and the second objects that were not identified. In this regard, the program code instructions for modifying the height may include program code instructions for reducing the height of the second objects that were not identified, such as by flattening the height of the second objects to ground. In one embodiment, the program code instructions for causing the visual representation of the plurality of objects to be provided may also include program code instructions for causing the visual representation of the first objects that were identified to have a predefined color.

In yet another embodiment, an apparatus is provided that includes means for identifying one or more objects representative of respective physical structures from among a plurality of objects representative of respective physical structures such that the plurality of objects include one or more first objects that were identified and one or more second objects that were not identified. Each object has an associated height. The apparatus of this embodiment also includes means for modifying the height associated with at least one of the objects representative of respective physical structures such that the height differential between the first objects that were identified and the second objects that were not identified is altered. The modification of the height causes at least one of the objects to have a modified height. The apparatus of this embodiment also includes means for causing a visual representation of the plurality of objects to be provided with at least one of the objects having the modified height.

BRIEF DESCRIPTION OF THE DRAWINGS

Figure 1:
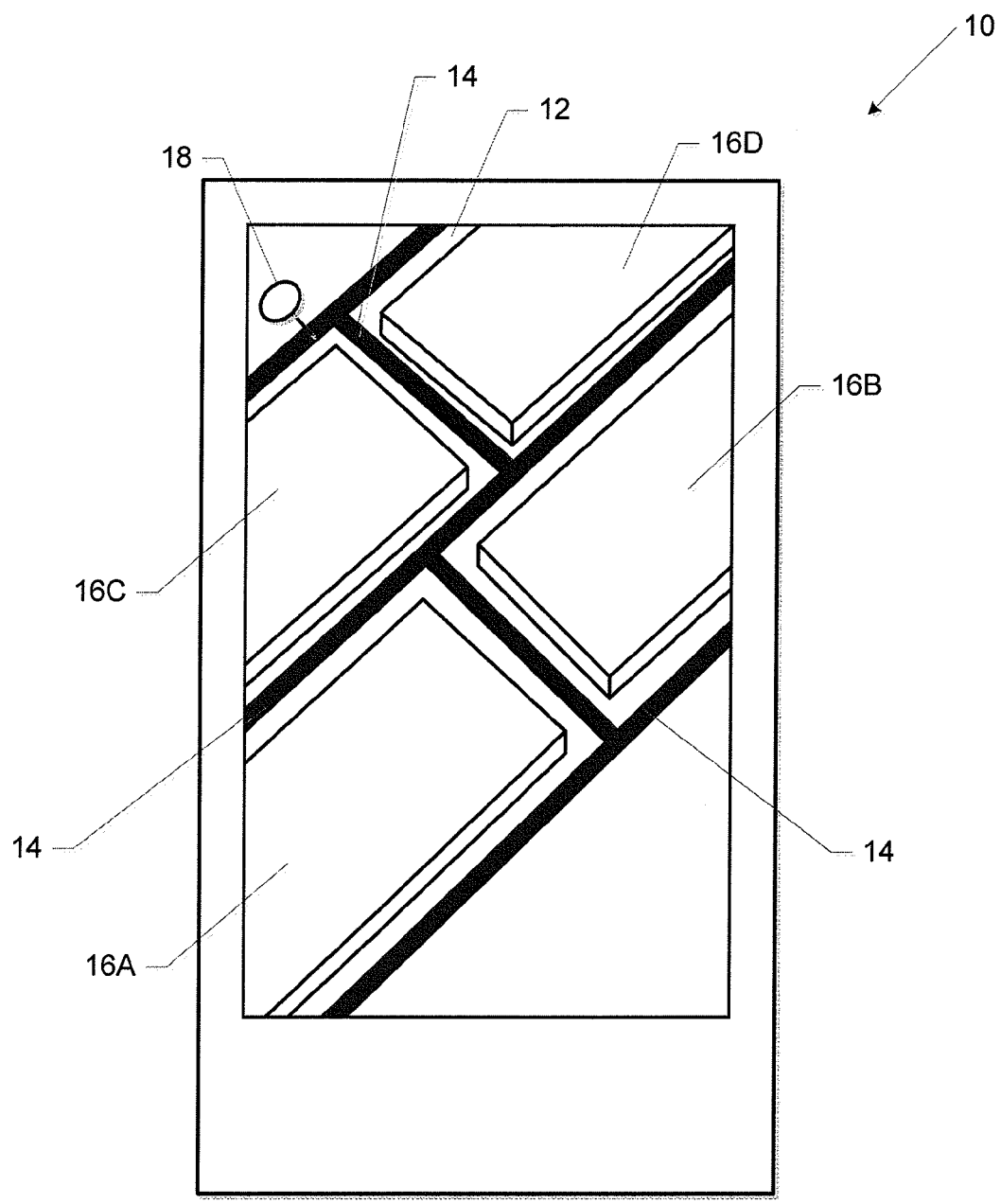
Figure 2:
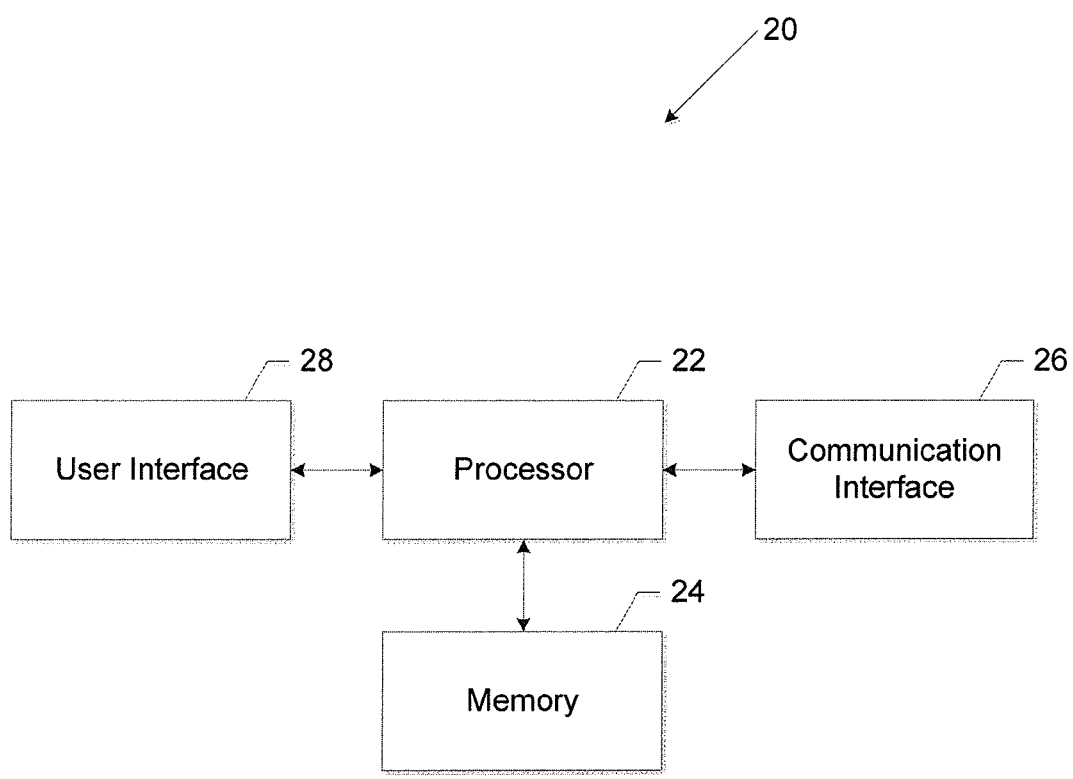
Figure 3:
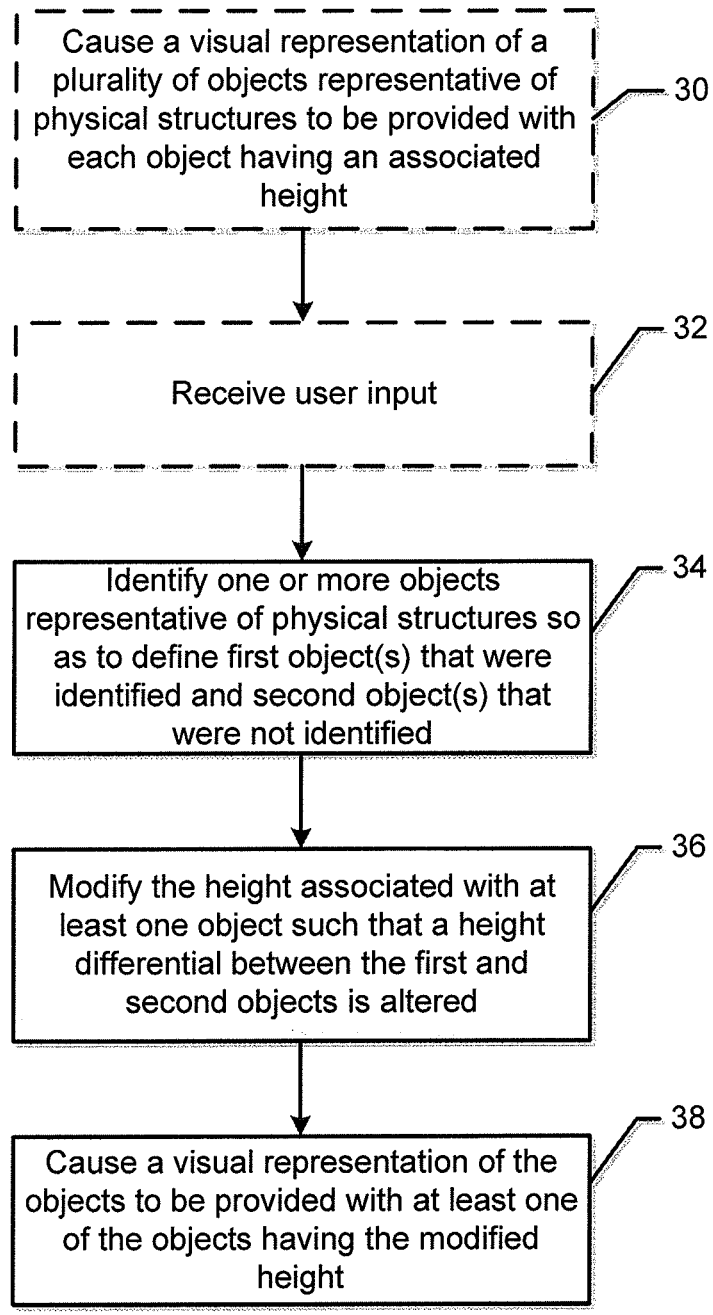
Figure 4:
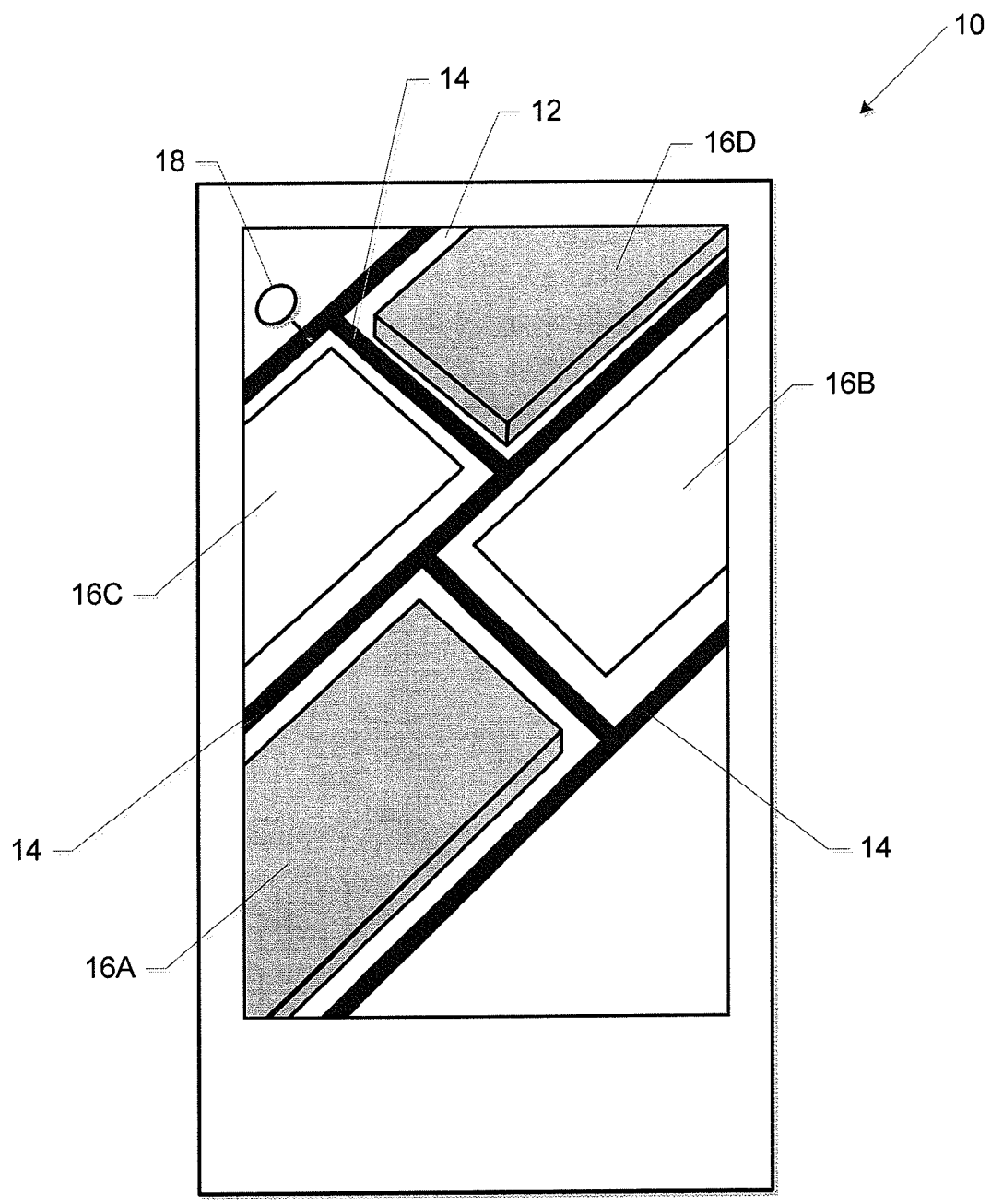
Figure 5:
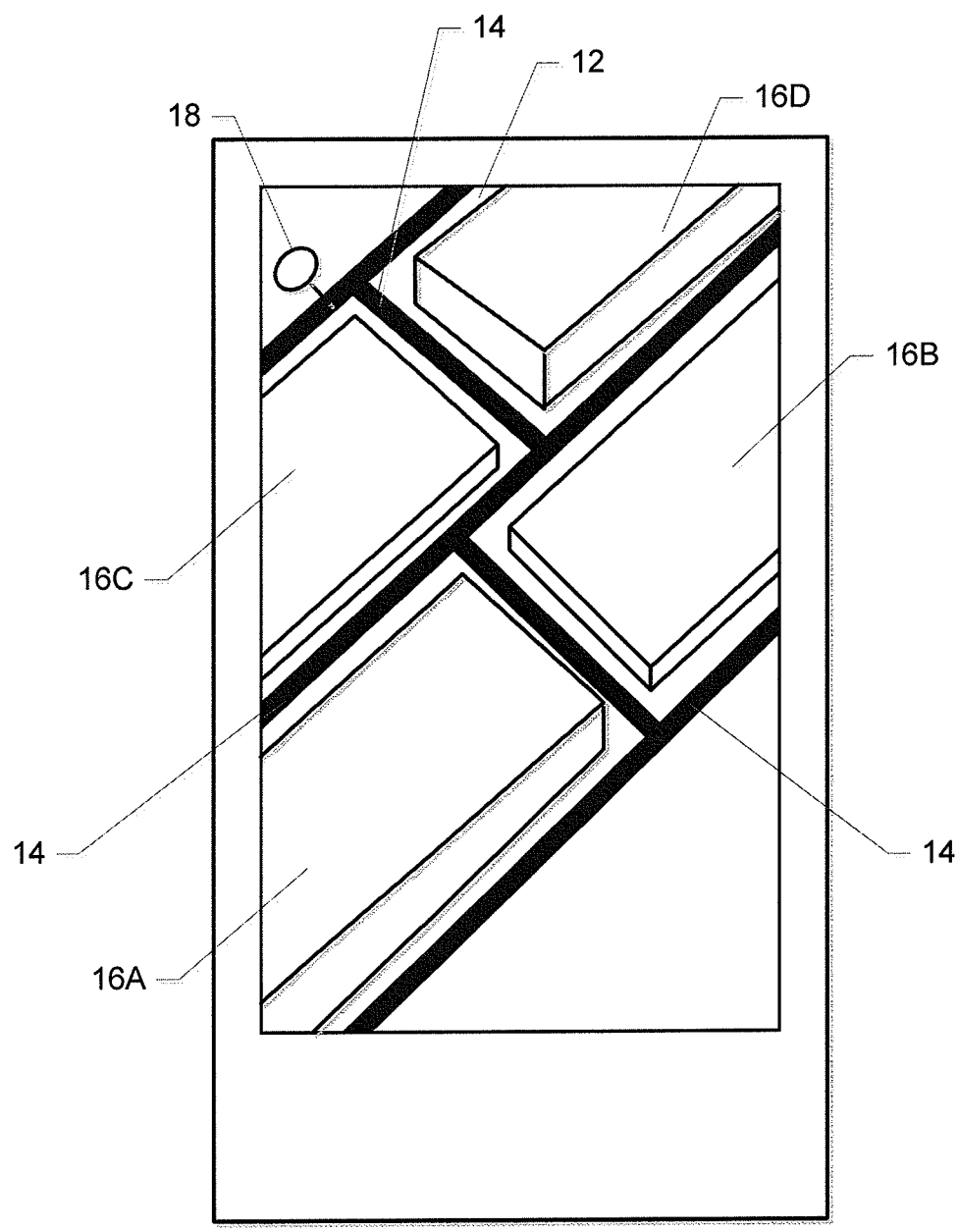
Figure 6:
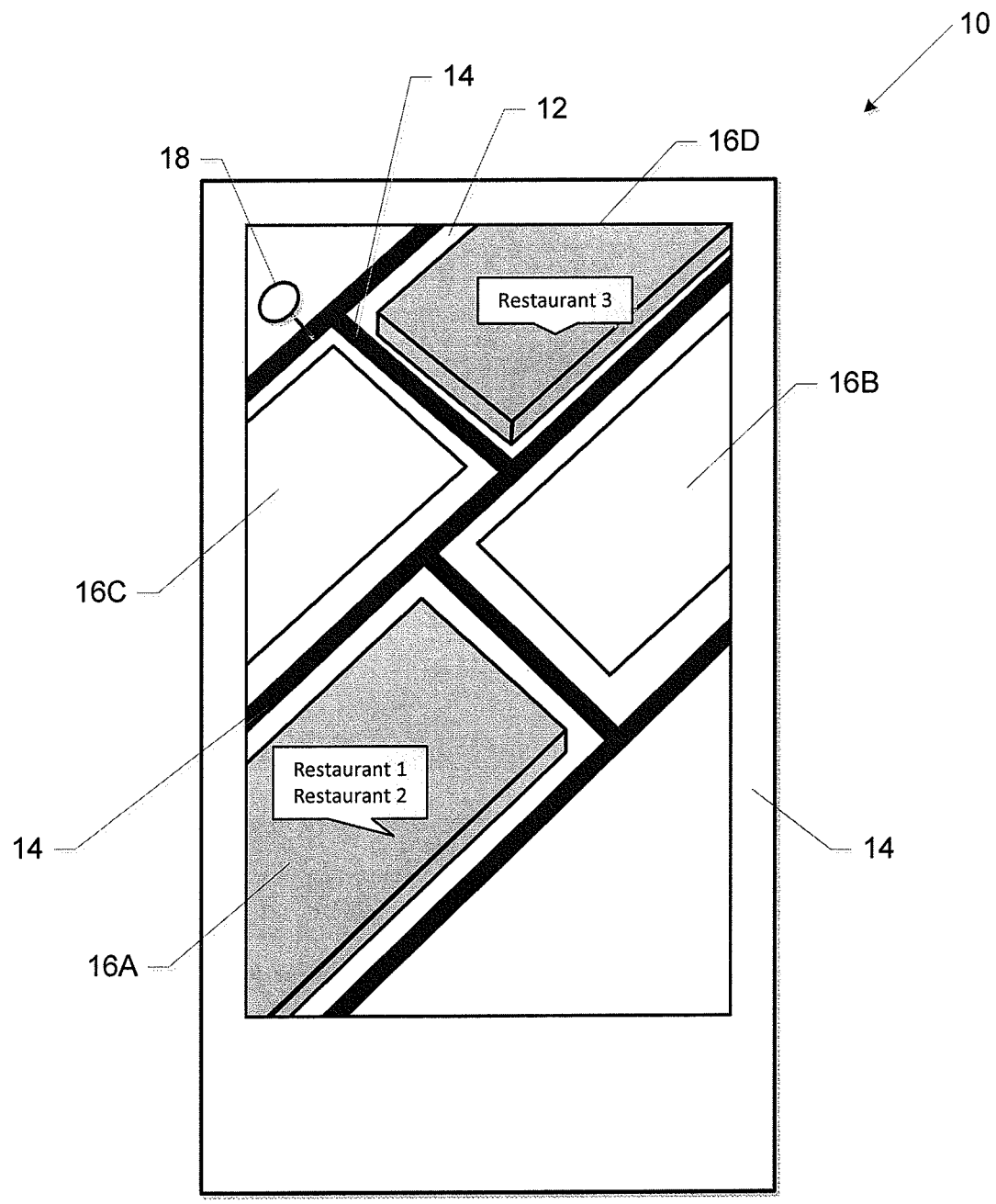
Figure 7:
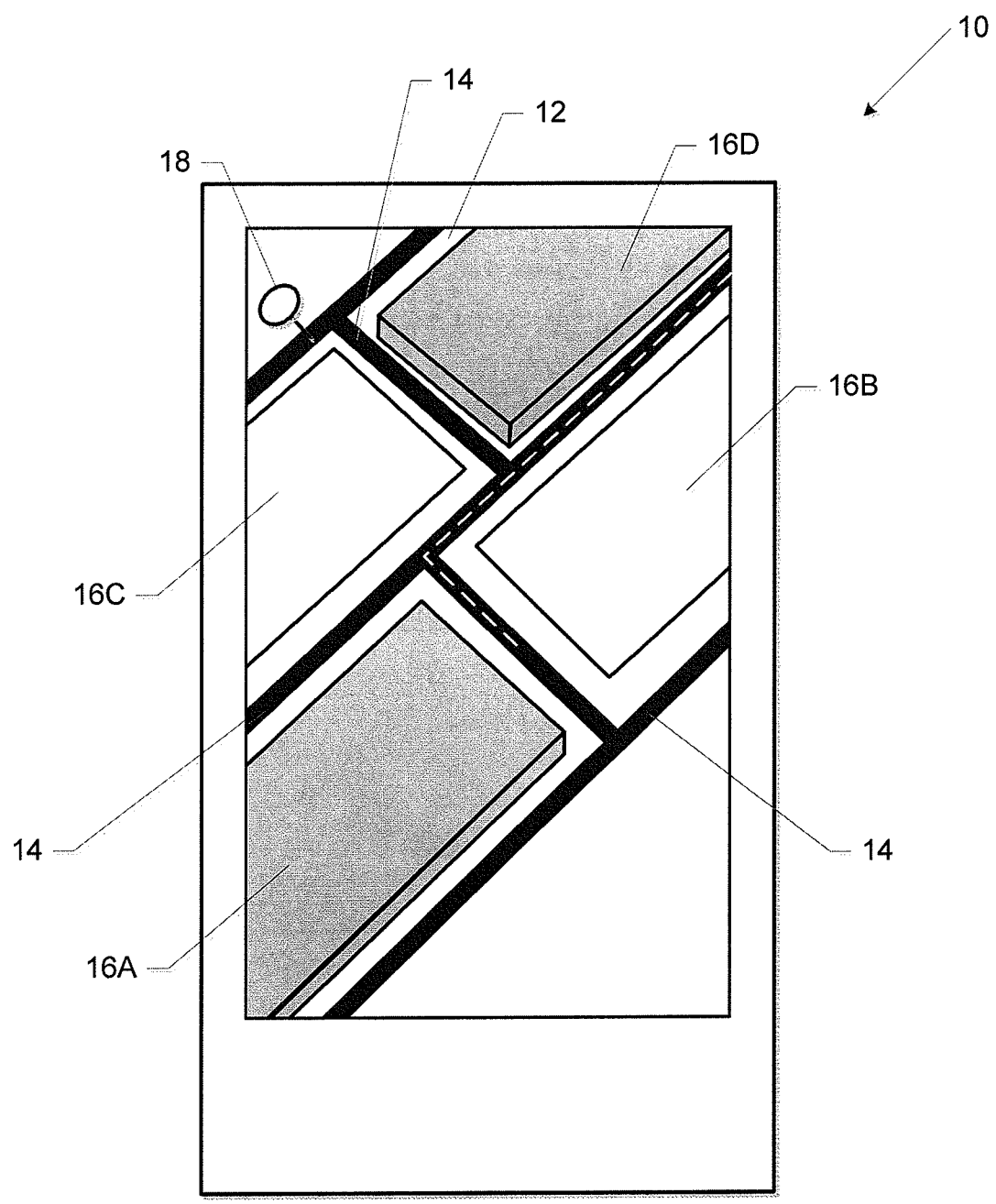

Having thus described certain example embodiments of the present invention in general terms, reference will hereinafter be made to the accompanying drawings, which are not necessarily drawn to scale, and wherein:

FIG. 1 illustrates a computing device, such as a mobile terminal, having a display that provides a three-dimensional visual representation of a plurality of buildings;

FIG. 2 is a block diagram of an apparatus that may be specifically configured in accordance with an example embodiment of the present invention;

FIG. 3 is a flowchart illustrating operations that may be performed, such as by the apparatus of FIG. 2, in accordance with an example embodiment of the present invention;

FIG. 4 illustrates a computing device having a display upon which a visual representation of a plurality of buildings is provided including buildings having a modified height in accordance with an example embodiment of the present invention;

FIG. 5 illustrates a computing device having a display upon which a visual representation of a plurality of buildings is provided including buildings having a modified height in accordance with another example embodiment of the present invention;

FIG. 6 illustrates the computing device with the display of FIG. 4 with additional information being presented in accordance with an example embodiment of the present invention; and FIG. 7 illustrates the computing device with the display of FIG. 4 with a route between two of the buildings being presented in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Referring now to FIG. 1, a computing device 10 is illustrated. The computing device may be of any of various types including a mobile terminal, such as a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems. Alternatively, the computing device may be a fixed computing device, such as a personal computer, a computer workstation, or the like. Regardless of the type of computing device, the computing device may include or otherwise be associated with a display 12. In this regard, the computing device may include a display, such as would be the case in conjunction with many of the aforementioned examples. Alternatively, the computing device may be remote from, but in communication with the display, such as in an embodiment in which the computing device is embodied by a server or other network entity that is configured to perform operations in accordance with an example embodiment of the present invention, such as set forth by FIG. 3, and to provide information and other directions to the display (which may, for example, be embodied by another computing device) to present the desired visual representation.

As described below and as shown in FIG. 1, the computing device 10 may be configured to cause a visual representation of a plurality of objects representative of respective physical structures to be presented upon the display. As described herein by way of example but not of limitation, the physical structures may be buildings. However, the objects may also be representative of other types of physical structures. In the illustrated embodiment, however, the visual representation of the plurality of buildings may be a multi-dimensional representation of the plurality of buildings, such as a two-dimensional representation of the plurality of buildings or a three-dimensional representation of the plurality of buildings as shown in FIG. 1. In this regard, the visual representation of the plurality of buildings of FIG. 1 includes buildings 16A, 16B, 16C and 16D that are located along various streets or other avenues 14. As used herein, buildings refer to any of a wide variety of physical structures including office buildings, houses, restaurants, stadiums, theaters, tents, statutes, landmarks or the like. Additionally, buildings as used herein may include both permanent structures and temporary structures.

The computing device 10, such as that shown in FIG. 1, may embody or otherwise be associated with an apparatus 20, such as shown in FIG. 2, configured to cause a plurality of operations such as those shown in FIG. 3, to be performed. It should also be noted that while FIG. 2 illustrates one example of a configuration of an apparatus for controllably altering the height differential between buildings within a visual representation of the buildings, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 20 may include or otherwise be in communication with a processor 22, a memory device 24 and optionally a communication interface 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may be embodied by a computing device 10, such as a mobile terminal. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 10. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms In some embodiments, the apparatus 20 may include a user interface 28 that may, in turn, be in communication with the processor 22 to provide output to the user and, in some embodiments, to receive an indication of a user input. As such, the user interface may include a display 12 and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 3, the operations that may be performed by an apparatus 20, such as shown in FIG. 2, embodied by or otherwise associated with a computing device 10, such as shown in FIG. 1, may include identifying one or more buildings. See block 34 of FIG. 3. In this regard, the apparatus may include means, such as the processor 22, user interface 28 or the like, for identifying the one or more buildings. The one or more buildings may be identified in various manners. For example, the one or more buildings may be identified in response to user input. In this embodiment, the apparatus 20 of one embodiment may include means, such as the processor 22, the user interface 28 or the like, for causing a visual representation of a plurality of buildings to be provided with each building having an associated height. See block 30 of FIG. 3. In this regard, the height of each building within the visual representation of the plurality of buildings may be representative of or proportional to the actual or physical height of the buildings, such that taller buildings are shown to be taller than shorter buildings. While the visual representation of the plurality of buildings is presented, the apparatus may receive user input. See block 32 of FIG. 3. Thus, the apparatus of this embodiment may include means, such as the processor, the user interface or the like, for receiving user input, such as the entry of a search term, the selection of one or more buildings or the like.

In an example embodiment, the apparatus 20, such as the processor 22, user interface 28 or the like, may be configured to receive a query with the one or more buildings being identified in response to the query. Although the apparatus, such as the processor, the user interface or the like, may be configured to receive the query in various manners, the apparatus, such as the processor, user interface or the like, may be configured to cause an icon 18, such as magnifying glass icon as shown in FIG. 1, to be presented upon the display 12. In response to the selection of the icon, user input may be solicited to define the query, such as by the user entering one or more key words in a predefined text box that is presented in response to selection of the icon. In response to the query, such as the identification of one or more search terms, one or more buildings that satisfy the query may be identified. By way of example, the user may select the icon and then enter "restaurants" as the search term. The apparatus, such as the processor or the like, may be configured in accordance with this example to identify each building that includes a restaurant in the proximity of the user. Alternatively, the user may select the icon and then enter the name or address of a building such that the building bearing the name or located at the address is identified. In this regard, the user may enter the address or name of two buildings between which the user wishes to obtain directions with the two buildings being identified, such as by the processor.

As noted above, the buildings may be identified in other manners and, indeed, the apparatus 20 may be responsive to other forms of user input in order to identify the buildings. For example, in an instance in which the user interface 28 and, more particularly, the display 12 is touch sensitive, the user may select one or more buildings, such as by tapping upon one or more buildings that are presented upon the display. The one or more buildings that are identified by tapping may then be identified, such as by the processor 22.

As a result of the identification of one or more buildings from among the plurality of buildings, such as in response to user input, the plurality of buildings may be subdivided by the apparatus 20, such as the processor 22, into one or more first buildings that were identified and one or more second buildings that were not identified. With respect to FIG. 1, for example, Building 16A and 16D may have been identified and may thereby be considered first buildings, while Building 16B and 16C may not have been identified and may therefore be considered second buildings.

As shown in block 36 of FIG. 3, the apparatus 20 may also include means, such as the processor 22 or the like, for modifying the height associated with at least one of the buildings. As such, a height differential between the first buildings that were identified and the second buildings that were not identified is altered. In this regard, the modification of the height may cause at least one of the buildings to have a modified height. As used herein, the modification of the height of the buildings does not relate to the modification of the actual height of the physical buildings, but, instead, to the modification of the height of the buildings as they appear within a visual representation of the buildings. In an instance in which the visual representation of the height of the buildings is initially (e.g., prior to modification) proportional to or otherwise representative of the actual height of the physical buildings, the visual representation of the height of the buildings following modification of the height of at least one of the buildings results in buildings having a modified height that is no longer proportional to or otherwise representative of the actual height of the physical buildings. As such, a shorter building that is identified, such as in response to a user query, may have its height increased, such as by a predefined percent, by a predefined amount, to a predefined height, etc., so as to appear within a visual representation of a plurality of buildings to be taller than another building that is actually taller in a physical sense but has not been modified in the same manner.

The height differential between the first and second buildings may be altered in various manners. For example, the height differential between the first buildings that were identified and the second buildings that were not identified may be increased in order to accentuate the first buildings that were identified and to facilitate that user's recognition of the first buildings that were identified. In order to increase the height differential between the first buildings that were identified and the second buildings that were not identified, the apparatus 20, such as the processor 22, may increase the height of the first buildings and/or decrease the height of the second buildings. As shown, for example, in FIG. 4, the apparatus, such as the processor, may decrease the height of the second buildings that were not identified. In this regard, the height of the second buildings may be decreased by various amounts, such as to a predefined height, e.g., 5 meters, and, in the illustrated embodiment, may be flattened to the ground so as to show the second buildings that were not identified to have a footprint, but to have no height. Alternatively or additionally, the apparatus, such as the processor, may increase the height of the first buildings that were identified as shown, for example, in FIG. 5.

The apparatus 20 may also include means, such as the processor 22, the user interface 28 or the like, for causing a visual representation of the plurality of buildings to be provided with at least one of the buildings having the modified height. See block 38 of FIG. 3. Thus, as described above, FIGS. 4 and 5 illustrate embodiments in which the computing device 10 causes a visual representation of the plurality of buildings to be provided with the second buildings 16B, 16C having a reduced height in the embodiment of FIG. 4 and the first buildings 16A, 16D having an increased height in the embodiment of FIG. 5. In order to further facilitate the recognition of the first buildings that were identified, the apparatus, such as the processor, the user interface or the like, may also cause the visual representation of the first buildings that were identified to have a predefined color, such as represented by the shading of the first buildings in FIGS. 4 and 5. The visual representation of the plurality of buildings that is caused to be provided by the apparatus, such as the processor, the user interface or the like, may be a multi-dimensional visual representation of the plurality of buildings, such as a two-dimensional visual representation or a three-dimensional visual representation as shown, for example, in FIGS. 4 and 5.

As described above, the first buildings may be identified in various manners. For example, the first buildings may be identified in response to user input defining a search query, such as a search for restaurants proximate to the user's current location. As shown in FIG. 6, the first buildings that were identified as including a restaurant proximate to the current location of the user may include building 16A and building 16D. As such, the height differential between the first buildings that include restaurants and the other second building may be increased, such as by flattening the second buildings to ground as shown in FIG. 6. In the illustrated embodiment, the apparatus 20, such as the processor 22, the user interface 28 or the like, may also cause information or other identifying indicia to be presented in conjunction with the visual representation of the first buildings. As shown in the embodiment of FIG. 6, for example, the apparatus, such as the processor, the user interface or the like, may cause information regarding the restaurants housed by each of the first buildings to be presented in conjunction with, such as a visual overlay upon, the visual representation of respective ones of the first buildings, such as upon the rooftops of the first buildings. While the example of FIG. 6 illustrates the name of each restaurant housed by the first buildings to be displayed, additional or other information may be provided if so desired including information regarding the type of cuisine, the menu, the hours, reviews or the like. For example, in an instance in which the search query relates to identification of theaters in proximity to the user, the information provided in conjunction with the visual representation of the first buildings may include not only an identification of the theaters, but a listing of the movies that are currently being presented and the show times of those movies.

In another embodiment, the first buildings may be identified in response to user input requesting directions from one of the first buildings, e.g., building 16A, to another of the first buildings, e.g., building 16D. In this embodiment, the apparatus 20, such as the processor 22, may determine the directions utilizing, for example, a mapping application and may thereafter cause a visual representation of the directions to also be provided. As shown in FIG. 7, the visual representation of the directions may include a visual representation of a route along the streets or other avenues 14, from one of the first buildings to the other of the first buildings. By having increased the height differential between the first and second buildings, such as by having reduced the height, e.g., having flattened to ground, the second buildings, the route between the first buildings may be easier to recognize. Although the route may be visually depicted as shown in FIG. 7, such as a dashed line along the streets or other avenues, directions between the first buildings may be provided in other manners including as a series of alphanumeric directions that, if followed, would take user between the first buildings. In this embodiment, the plurality of directions may also be presented upon the display 12, such as an overlay, upon the visual representation of the plurality of buildings with a height differential between the first and second buildings having been modified.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the blocks having a dashed outline in FIG. 3. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    identifying one or more objects representative of respective physical structures from among a plurality of objects representative of respective physical structures such that the plurality of objects representative of respective physical structures comprise one or more first objects that were identified and one or more second objects that were not identified, each object having an associated height;
    modifying, with a processor, the height associated with at least one of the objects representative of respective physical structures, wherein modifying the height comprises increasing the height associated with at least one of the first objects that were identified and reducing the height associated with at least one of the second objects that were not identified such that a height differential between the first objects that were identified and the second objects that were not identified is altered; and
    causing a visual representation of the plurality of objects representative of respective physical structures to be provided with at least one of the first and second objects having a modified height such that the visual representation of at least one of the first objects having an increased height is not proportional to an actual height of the physical structure represented by the first object.

2. A method according to claim 1 wherein modifying the height comprises increasing the height differential between the first objects that were identified and the second objects that were not identified.

3. A method according to claim 1 wherein reducing the height of the second objects that were not identified comprises flattening the height of the second objects to ground.

4. A method according to claim 1 wherein causing the visual representation of the plurality of objects representative of respective physical structures to be provided comprises causing the visual representation of the first objects that were identified to have a predefined color.

5. A method according to claim 1 wherein causing the visual representation of the plurality of objects representative of respective physical structures to be provided comprises causing a three-dimensional visual representation of the plurality of objects to be provided.

6. A method according to claim 1 wherein identifying one or more objects representative of respective physical structures comprises identifying one or more objects in response to user input provided in a form of one or more key words or search terms.

7. A method according to claim 1 wherein identifying one or more objects representative of respective physical structures comprises identifying one or more objects in response to user input provided in a form of a name or address of a physical structure.

8. An apparatus comprising at least one processor and at least one memory including computer program code, the at least one memory and the computer program code configured to, with the processor, cause the apparatus to at least:
    identify one or more objects representative of respective physical structures from among a plurality of objects representative of respective physical structures such that the plurality of objects representative of respective physical structures comprise one or more first objects that were identified and one or more second objects that were not identified, each object having an associated height;
    modify the height associated with at least one of the objects representative of respective physical structures by increasing the height associated with at least one of the first objects that were identified and reducing the height associated with at least one of the second objects that were not identified such that a height differential between the first objects that were identified and the second objects that were not identified is altered; and
    cause a visual representation of the plurality of objects representative of respective physical structures to be provided with at least one of the first and second objects having a modified height such that the visual representation of at least one of the first objects having an increased height is not proportional to an actual height of the physical structure represented by the first object.

9. An apparatus according to claim 8 wherein the at least one memory and the computer program code are configured to, with the processor, cause the apparatus to modify the height by increasing the height differential between the first objects that were identified and the second objects that were not identified.

10. An apparatus according to claim 8 wherein the at least one memory and the computer program code are configured to, with the processor, cause the apparatus to reduce the height of the second objects that were not identified by flattening the height of the second objects to ground.

11. An apparatus according to claim 8 wherein the at least one memory and the computer program code are configured to, with the processor, cause the apparatus to cause the visual representation of the plurality of objects representative of respective physical structures to be provided by causing the visual representation of the first objects that were identified to have a predefined color.

12. An apparatus according to claim 8 wherein the at least one memory and the computer program code are configured to, with the processor, cause the apparatus to cause the visual representation of the plurality of objects representative of respective physical structures to be provided by causing a three-dimensional visual representation of the plurality of objects to be provided.

13. An apparatus according to claim 8 wherein the at least one memory and the computer program code are configured to, with the processor, cause the apparatus to identify one or more objects representative of respective physical structures by identifying one or more objects in response to user input provided in a form of one or more key words or search terms.

14. An apparatus according to claim 8 wherein the at least one memory and the computer program code are configured to, with the processor, cause the apparatus to identify one or more objects representative of respective physical structures by identifying one or more objects in response to user input provided in a form of a name or address of a physical structure.

15. A computer program product comprising at least one non-transitory computer-readable storage medium having computer-executable program code portions stored therein, the computer-executable program code portions comprising program code instructions for:

identifying one or more objects representative of respective physical structures from among a plurality of objects representative of respective physical structures such that the plurality of objects representative of respective physical structures comprise one or more first objects that were identified and one or more second objects that were not identified, each object having an associated height;

modifying the height associated with at least one of the objects representative of respective physical structures, wherein modifying the height comprises increasing the height associated with at least one of the first objects that were identified and reducing the height associated with at least one of the second objects that were not identified such that a height differential between the first objects that were identified and the second objects that were not identified is altered; and causing a visual representation of the plurality of objects representative of respective physical structures to be provided with at least one of the first and second objects having a modified height such that the visual representation of at least one of the first objects having an increased height is not proportional to an actual height of the physical structure represented by the first object.

16. A computer program product according to claim 15 wherein the program code instructions for modifying the height comprise program code instructions for increasing the height differential between the first objects that were identified and the second objects that were not identified.

17. A computer program product according to claim 15 wherein the program code instructions for reducing the height of the second objects that were not identified comprise program code instructions for flattening the height of the second objects to ground.

18. A computer program product according to claim 15 wherein the program code instructions for causing the visual representation of the plurality of objects representative of respective physical structures to be provided comprise program code instructions for causing the visual representation of the first objects that were identified to have a predefined color.

19. A computer program product according to claim 15 wherein the program code instructions for causing the visual representation of the plurality of objects representative of respective physical structures to be provided comprise program code instructions for causing a three-dimensional visual representation of the plurality of objects to be provided.

20. A computer program product according to claim 15 wherein the program code instructions for identifying one or more objects representative of respective physical structures comprise program code instructions for identifying one or more objects in response to user input provided in a form of one or more key words or search terms or a name or address of a physical structure.

* * * * *